United States Patent Office 3,527,714
Patented Sept. 8, 1970

3,527,714
ACID LEACHING OF COBALT OR NICKEL CATALYSTS PRIOR TO POLYMER VAPORIZATION
James Keith Hambling, Frimley, near Aldershot, John Robert Jones, Walton-on-Thames, and Kuldar Heljula, Twickenham, England, assignors to The British Petroleum Company Limited, London, England, a corporation of England
No Drawing. Filed Oct. 23, 1967, Ser. No. 677,044
Claims priority, application Great Britain, Nov. 29, 1966, 53,405/66
Int. Cl. B01j *11/02*
U.S. Cl. 252—413       5 Claims

ABSTRACT OF THE DISCLOSURE

Spent cobalt or nickel on carbon catalysts which have been used for olefin polymerisation are regenerated by leaching the spent catalyst with a mineral acid, e.g., $HNO_3$, until substantially all the cobalt or nickel is removed, heating the leached catalyst to 150–1000° C. to remove adsorbed polymer, cooling and impregnating with an aqueous solution of a heat decomposable cobalt or nickel salt, e.g., cobalt or nickel nitrate. The heating of the leached catalyst is preferably effected in a carrier gas. The impregnated catalyst may be activated by heating under nitrogen or by heating in a fluidised bed under increasing temperature, saturating the bed with water when the temperature has reached 180–220° C., continuing heating with fluidisation to remove water and finally heating to a temperature not above 300° C. to decompose the cobalt or nickel compound.

---

This invention relates to the regeneration of spent or partially spent catalysts comprising cobalt or nickel in combination with activated carbon which have been used in the conversion of lower olefins, particularly ethylene, propylene and butenes to predominantly linear polymers, particularly linear dimers.

Such catalysts and processes have been described in German Pat. 559,736 and U.S. Pats. 2,380,358, 2,407,813, 2,407,814 and 2,692,295. From the known art it is apparent that catalysts prepared by initially impregnating active carbon with a cobalt or nickel salt of oxygen-containing mineral acid, e.g., nitric acid, in general possess the most favourable activities.

U.S. Pat. 2,380,358 states that although the effective life of the catalyst is quite long its efficiency nevertheless appears to decrease with use. For example when a catalyst consisting of reduced cobalt disposed on activated carbon was used for a relatively long period of time for the conversion of ethylene to polymers predominating in butylene, the conversion rate began to drop so that with time the process becomes uneconomical because of the low conversion rates. This drop in efficiency was apparently due to the adsorption of ethylene polymers by the catalyst. In order to regenerate the catalyst it was therefore necessary to remove these adsorbed organic materials. This was effected by heating the partially spent catalyst to a temperature sufficient to vaporise the impurities.

We have discovered that whereas this procedure works comparatively well for ethylene polymerisation its application to catalysts which have been used for the polymerisation of propylene and other olefins is of limited use. Regeneration in these cases is only partial and the catalyst activity falls much more quickly than with a freshly prepared catalyst. Furthermore, when the catalyst has been previously employed for a very long period of time (100 h.) with very pure feedstock, the degree of regeneration achieved by this technique is very small.

We believe that when the catalyst is employed for a very long period of time, not only is the catalyst deactivated by reason of adsorption of olefin polymers which can readily be removed, but it is also deactivated by a chemical change the nature of which is not yet fully understood in the state of the cobalt or nickel deposited on the carbon, a chemical change which is not reversed simply by heating, either in the presence or absence of an inert gas or hydrogen.

Our copending U.K. Pat. 1,091,094 and its corresponding U.S. application Ser. No. 591,038, filed Oct. 26, 1966 and now abandoned, disclose a process for the regeneration of a spent or partially spent catalyst comprising cobalt or nickel in combination with activated carbon which has been used in the conversion of lower olefins to predominantly linear polymers and which contains adsorbed polymer, which process comprises heating the spent or partially spent catalyst to a temperature in the range 200° C. to 1000° C. to remove adsorbed polymer, cooling the heat treated substance and impregnating the cooled substance with an aqueous solution of an acid and a heat decomposable cobalt or nickel salt and isolating the impregnated material.

We have now discovered that if the cobalt or nickel is removed prior to heat treatment, polymer may be removed under milder conditions, i.e., lower temperatures and/or shorter reaction periods, than would be the case if the cobalt or nickel were not removed.

Thus according to the present invention there is provided a process for the regeneration of a spent or partially spent catalyst comprising cobalt or nickel in combination with activated carbon which has been used in the conversion of lower olefins to predominantly linear olefins and which contains adsorbed polymer, which process comprises leaching the spent or partially spent catalyst with mineral acid until substantially all the cobalt or nickel is removed, heating the leached catalyst to a temperature in the range 150 to 1000° C. to remove adsorbed polymer, cooling the heat treated substance and impregnating the cooled substance with an aqueous solution of a heat decomposable cobalt or nickel salt and isolating the impregnated material.

The activated carbon is preferably an activated vegetable charcoal such as coconut charcoal, or coal charcoal.

The isolated catalyst may then be activated according to methods well known in the art, such as heating under an atmosphere of nitrogen, or by the method disclosed in British patent specification 1,024,314 which comprises suspending the impregnated carbon in a fluidised bed by means of an inert gas under conditions of increasing temperature, saturating the bed with water when the temperature has risen to 180–220° C., continuing heating under fluidised conditions at said temperature until substantially all the water has been removed and thereafter raising the temperature of the bed to a temperature not exceeding 300° C. to complete the decomposition of the cobalt or nickel compound.

Activated carbon is highly porous and has a high surface area. The decomposition of cobalt or nickel reduces the surface area of the resulting material somewhat and the surface area of an exhausted catalyst is very low, comparatively speaking. For example, a steam-activated coconut shell charcoal may initially have a surface area of about 1200 $m.^2/g.$ and after impregnation with 18% cobalt this may be reduced to 850–900 $m.^2/g.$ The surface area of an exhausted catalyst containing adsorbed polymer may be as low as 40 $m.^2/g.$ or even lower.

Preferably leaching is effected by treatment with aqueous nitric acid at elevated temperature.

It has already been indicated that blocking of active sites by polymer deposition is not the only cause of catalyst decay. Nevertheless, the greater the restoration of the initial surface area of the catalyst the more effective will be the regeneration process. This is the purpose of the heat treatment.

Preferably heating the leached catalyst is carried out in the presence of a carrier gas to facilitate removal of the adsorbed polymer. Suitable carrier gases include nitrogen, steam and hydrogen.

If nitrogen or steam is used as the carrier gas then the temperature of treatment is preferably in the range 300 to 600° C. If hydrogen is used, the temperature need not be so high, e.g., from 200 to 400° C. This is because hydrogen converts the adsorbed olefinic polymers to paraffinic polymers which are less strongly adsorbed on the catalyst surface.

The leached substance is impregnated with the aqueous solution of the cobalt or nickel salt. Impregnation may be effected at room temperature. Preferably the mixture is allowed to stand for ½ hour or more. The mixture may then be filtered and the impregnated catalyst dried, e.g., by allowing to stand in air. The conditions of impregnation are preferably such that the final cobalt or nickel content lies in the range 12–30% by weight.

The preferred heat decomposable salts are the nitrates of cobalt or nickel; other suitable salts include the formate and acetate.

The regeneration process is particularly suitable for regenerating cobalt on charcoal catalysts which have been employed in the dimerisation of propylene.

The regeneration process may be repeated as and when the regenerated catalyst itself loses activity.

The invention is illustrated with reference to the following example.

EXAMPLE

A cobalt-on-charcoal catalyst containing about 18 percent by weight of cobalt, having a surface area of about 850 m.²/gm., and an activity (on a 5-hour propylene polymerisation at 40° C. and 400 p.s.i. in a batch autoclave test) of about 5.0 g./g./h., was employed to dimerise propylene in a fixed bed reactor until its activity was less than 0.1 g./g./h. The catalyst produced over 300 g. dimer per g. catalyst and was found to have a surface area of only 86 m.²/g.

The spent catalyst was leached with warm 10 percent nitric acid until the percent weight of cobalt on the catalyst fell to 1.0. The leached spent catalyst was heated in nitrogen at 400° C. for 1 hour, and was then found to have a surface area of 1100 m.²/g.

The catalyst treated in this manner was reimpregnated with a 3:1 by weight cobalt nitrate hexahydrate:water solution. The catalyst was filtered off and activated with nitrogen (as described in British Pat. 1,024,314). The product had a surface area of 685 m.²/g. and contained 19.5 percent by weight of cobalt.

The catalyst (9.8 g.) was charged under nitrogen to a 1-litre rocking autoclave which was pressured with liquid propylene to 600 p.s.i.g. and maintained at this pressure for 5 hours at 40° C. The reaction products were then removed via a dip-tube into cooled receivers. After evaporation of unreacted propylene at room temperature the residue was distilled. 225 g. hexenes were recovered containing 52.0 percent linear hexenes and less than 0.5 percent 2-methylpentene-2. 20 g. of higher boiling material were also recovered. This corresponded to a catalyst activity of 5.0 g./g./h.

What we claim is:

1. A process for the regeneration of a spent or partially spent catalyst comprising cobalt or nickel in combination with activated carbon which has been used in the conversion of lower olefins to predominantly linear olefins and which contains adsorbed polymer, which process comprises leaching the spent or partially spent catalyst with mineral acid until substantially all the cobalt or nickel is removed from the catalyst, heating the leached catalyst in the presence of steam, nitrogen, or hydrogen as a carrier gas to a temperature in the range 300 to 600° C. when the carrier gas is steam or nitrogen and to a temperature in the range 200 to 400° C. when the carrier gas is hydrogen to remove adsorbed polymer from the leached catalyst, cooling the heat treated catalyst, impregnating the cooled catalyst with an aqueous solution of a heat decomposable cobalt or nickel salt to insure that the final cobalt or nickel content lies in the range 12–30% by weight and recovering the impregnated regenerated catalyst.

2. A process according to claim 1 wherein the activated carbon is an activated vegetable charcoal such as coconut charcoal, or coal charcoal.

3. A process according to claim 1 wherein the leaching is effected with aqueous nitric acid at elevated temperature.

4. A process according to claim 1 wherein the impregnation is effected by allowing the mixture to stand for at least ½ hour.

5. A process in accordance with claim 1 wherein the heat decomposable cobalt or nickel salt is a nitrate.

References Cited

UNITED STATES PATENTS

| 2,692,261 | 10/1954 | Peters et al. | 252—447 |
| 3,243,383 | 3/1966 | Schultz et al. | 252—411 |
| 3,409,703 | 11/1968 | Engelbrecht et al. | 260—683.15 |

FOREIGN PATENTS

| 1,024,314 | 3/1966 | Great Britain. |
| 1,152,388 | 8/1963 | Germany. |

DANIEL E. WYMAN, Primary Examiner

P. E. KONOPKA, Assistant Examiner

U.S. Cl. X.R.

252—447; 260—683.15